United States Patent [19]

Hollerweger et al.

[11] Patent Number: 4,671,227

[45] Date of Patent: Jun. 9, 1987

[54] HYDRAULIC ENGINE MOUNT

[76] Inventors: Heinz Hollerweger, Effnerstrasse 20, D-8070 Ingolstadt; Bodo Aden, Hauptstrasse 17, D-8069 Königsfeld; Geert Kuipers, Am Kirchenweg 1a, D-8070 Ingolstadt; Johannes van den Boom, Marie-Luise-Fleisser-Str. 16, D-8073 Kösching, all of Fed. Rep. of Germany

[21] Appl. No.: 741,862

[22] Filed: Jun. 6, 1985

[30] Foreign Application Priority Data

Jun. 7, 1984 [DE] Fed. Rep. of Germany ....... 3421135

[51] Int. Cl.$^4$ ............................ B60K 5/12; F16F 9/10
[52] U.S. Cl. ............................... 123/192 R; 180/312; 248/550; 248/566; 248/636
[58] Field of Search ...................... 123/195 A, 192 R; 180/312; 248/550, 566, 636

[56] References Cited

U.S. PATENT DOCUMENTS

| 4,154,206 | 5/1979 | Le Salver et al. | 123/192 R |
| 4,418,895 | 12/1983 | Bertin et al. | 248/636 |
| 4,428,569 | 1/1984 | Takei | 248/636 |
| 4,516,545 | 5/1985 | Kumagai et al. | 123/195 A |

FOREIGN PATENT DOCUMENTS

| 58408 | 8/1982 | European Pat. Off. | 180/312 |
| 68395 | 1/1983 | European Pat. Off. | 180/312 |
| 3222204 | 12/1983 | Fed. Rep. of Germany | 180/312 |

*Primary Examiner*—Ira S. Lazarus
*Attorney, Agent, or Firm*—Karl Hormann

[57] ABSTRACT

A hydraulic engine mount comprising two fluid-filled chambers normally communicating with each other to affect a controlled throttled exchange of fluid between them sufficient to absorb relative movements of high frequency low amplitude between an engine and a chassis. Relative movements of high amplitude and low frequency may be absorbed by rendering the mount soft by opening a bypass to provide for a substantially unimpeded flow of fluid between the chambers. Preferably, the bypass is provided with valve means controlled by sensors reacting to parameters representing engine performance or the like.

7 Claims, 16 Drawing Figures

HYDRAULIC ENGINE MOUNT

This application is related to application Ser. No. 741,872 filed June 6, 1985.

BACKGROUND OF THE INVENTION

The present invention relates to apparatus for connecting elements together, and for damping or absorbing relative motion occurring between such elements. More particularly, the invention relates to hydraulic engine mounts of the kind provided with external controls for neutralizing by damping or absorbing relative movements of predetermined amplitudes between an engine and the chassis of an automotive vehicle.

Automotive engines do not always run smoothly. For instance, particularly during starting, before reaching their proper operating temperature, internal combustion engines may rock considerably and run roughly. Such rough running performance is unpleasant to drivers, and it is detrimental to the vehicle generally. Attempts have, therefore, been made to provide engine mounts capable of damping or absorbing the high amplitudes characteristic of rough engine performance.

Hydraulic engine mounts have been used successfully to reduce the effects of rough or rocky engine performance by damping or absorbing and thus substantially neutralizing high amplitude movements, by varying the resiliency of the mounts as a function of particular engine running conditions.

Thus, published Japanese Patent Application No. 57/76340(A) discloses a hydraulic engine mount comprising a support connected to an anchor by means of an elastic wall member. Support, anchor and wall member enclose a chamber filled with a fluid. A further chamber of variable volume and also filled with a fluid, is connected to a first chamber by a passage or conduit which permits some exchange of fluid between the chambers to equalize pressure differentials. A partition member having a throttle hole is slidably mounted within a widened section of the conduit. When the support is subjected to vibrations or movements of low frequency and high amplitude, the elastic wall member is elastically deformed and the capacity of the further fluid chamber is changed causing a pressure differential in the fluid in the two chambers. The partition member, under such circumstances, is said to descend instantly and fluid escapes from the second chamber into the first chamber through a narrow throttle hole provided in the partition member. This results in some damping of the movement owing to the resistance of the viscous fluid flowing through the throttle hole. In case of high frequency and low amplitude movements, the partition member is said vertically to reciprocate by a change in the pressure in the fluid in the chambers to absorb such minor movements. While the device may offer limited relief from the effects of relative movements of high amplitude between an engine and a chassis, the effectiveness of the device is not only limited but it is in any event unpredictable. A variety of hydraulic engine mounts of this kind has become known. In praxi such mounts have not always performed satisfactorily for they have been found sometimes to transfer high amplitude movements between the elements connected by them.

It is, therefore, an object of the invention to provide an improved hydraulic engine mount. A more specific object of the invention resides in the provision of a hydraulic engine mount capable of absorbing, or at least damping, engine movements of high amplitude.

Another object of the invention is to provide a hydraulic engine mount having variable movement absorption capability.

Furthermore, the invention has as one of its objects the provision of a hydraulic engine mount the movement absorbing capability of which may be effectively controlled to suit particular running conditions of an internal combustion engine.

A further object of the invention resides in an improved hydraulic engine mount which may be controlled by external controls.

SUMMARY OF THE INVENTION

In the accomplishment of these and other objects, the invention provides for a hydraulic engine mount comprising a support member adapted to be connected to an automotive engine, an anchor adapted to be connected to an automotive chassis, a first chamber the volume of which is affected by the support member and which is at least partially filled with a fluid, a second chamber at least partially filled with a fluid and being of variable capacity, means providing a predictable throttling effect on fluid flowing from the first chamber into the second chamber, a deflectable element affected by the volume of the first chamber, means for limiting the deflection of the deflectable element and means for rendering the throttling means ineffective.

These and other objects of the invention will in part be obvious and will in part become apparent from the detailed description taken together with the appended drawings. The scope of protection sought, however, is to be determined solely by the claims hereinafter set forth.

DESCRIPTION OF PREFERRED EMBODIMENTS

Figure 1:
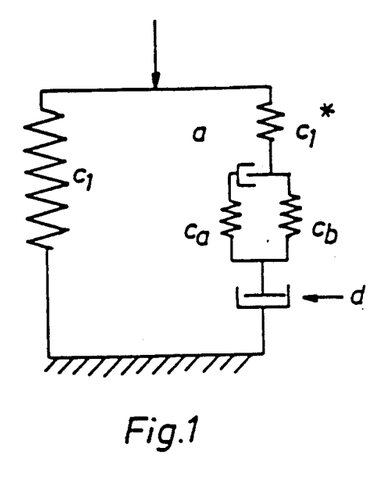
FIG. 1 is an equivalent function diagram explaining the function of engine mounts in accordance with the prior art.

FIG. 1 is an equivalent function diagram of a prior art engine mount of the kind referred to supra. The characteristics of this engine mount are determined by the following parameters:

The dynamic spring stiffness (exclusive of the volume stiffness of a support member) is expressed by the spring constant $c_1$, and parallel to which there is connected the spring constant $c_1^*$ representing the volume stiffness. In this respect, there is no difference between single chamber and dual chamber engine mounts. The second chamber is separated from the first chamber by an element which is deflectable by a relatively weak spring force; thus, application of the force on the support results in an increase in the pressure in the first chamber and causes the element to be deflected. This characteristic of resiliency which is primarily determined by the spring constant of the deflectable member, is depicted by the constant $c_b$. Deflection in the upward as well as in the downward direction is limited by an abutment a. However, when the deflectable element engages the abutment the spring constant $c_b$ is rendered ineffective and is subjugated to a harder spring constant $c_a$. To suit the requirements placed upon the mount $c_a$ is chosen to be considerably higher than $c_b$. A fluid conduit between the two chambers is represented by the damping member d.

As mentioned above, such mounts are often subjected to forceful jolts or knocks, particularly where high amplitudes have to be absorbed at low engine revolutions, for instance, during starting of the engine or when the engine is running roughly.

Figure 2:
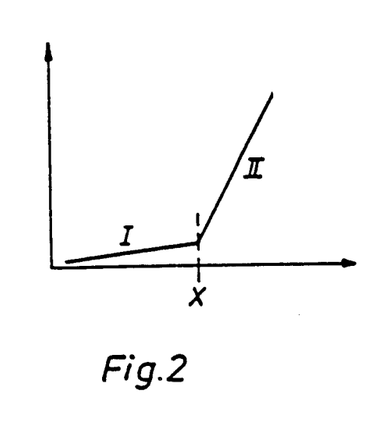
FIG. 2 is the characteristic curve of a deflectable member of such prior art engine mounts.

FIG. 2 is a diagrammatic representation of the change in spring stiffness relative to amplitude. The spring stiffness $c_b$ is effective in a range marked I. At point X the amplitude is sufficiently high to cause deflection of the deflectable member into engagement with the abutment a. At this point, spring force $c_a$ becomes additionally effective, this range being represented by II along the curve. In order to reduce the impact on the abutment, provisions leading to a smoother transition between ranges I and II in the area of X would have to be made. That is to say, the change from I to II should progress to a more gradual fashion. This could be accomplished, for instance, by imparting a greater slope to range I and to reduce the slope of range II. Such an arrangement would, however, depart from the desirable performance characteristics of an engine mount.

Figure 3:
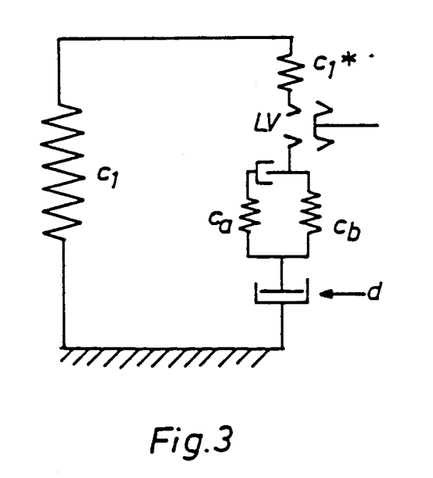
FIG. 3 is an equivalent function diagram of an engine mount in accordance with the present invention.

With a view to avoiding these undesirable performance characteristics a system as shown in the equivalent function diagram of FIG. 3 was devised. As will be seen in the range marked LV, the lower end of the spring $c_1^*$ may be separated from the parallel connected springs $c_a$ and $c_b$. During operational circumstances in which movement of high amplitude and low frequency occur, for instance at low engine revolutions, it would, as shown, be possible to sever this connection. The parallel connection of $c_a$ and $c_b$ which is responsible for the hard knock in the transitional range marked X thus remains ineffective and the constant of resiliency is merely that of spring $c_1$. Under such conditions, damping is not necessary.

Figure 4:
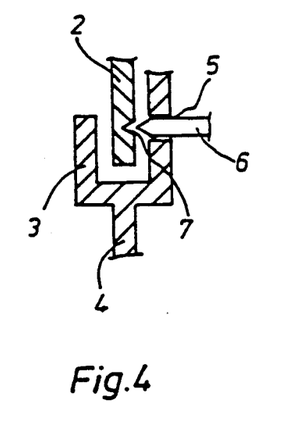
FIG. 4 is a detail of the diagram of FIG. 3.

FIG. 4 depicts a possible way of providing for such separable connection. Member 2 is connected to the spring $c_1^*$ and is received in a clamp-like fixture 3. The fixture 3 is connected to the parallel-connected spring $c_a$ and $c_b$ by way of an extension 4. The fixture 3 is provided with an opening 5 into which a fastener 6 may be inserted for rigidly connecting the member 2, by a corresponding recess 7, to the fixture 3 and the extension 4.

The following is a description of preferred embodiments of hydraulic engine mounts incorporating the principles of the present invention.

Figure 5:
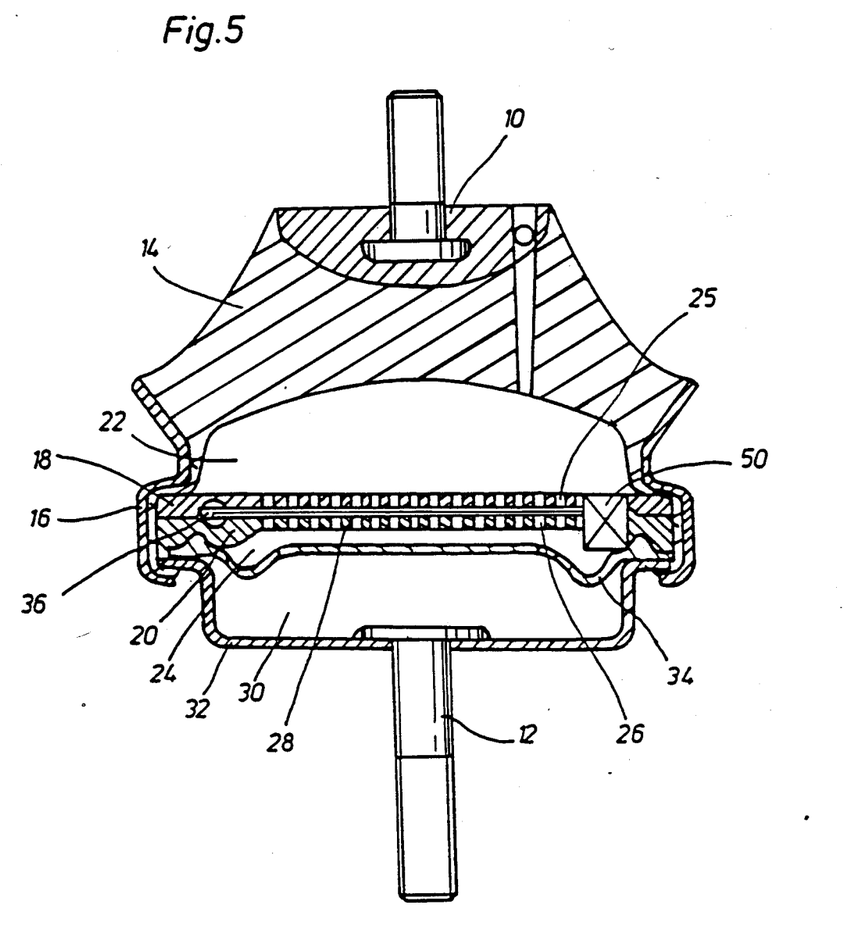
FIGS. 5–14 depict preferred embodiments of the engine mount in accordance with the invention.

FIG. 5 depicts a first preferred embodiment of a hydraulic engine mount. The mount comprises a support member 10 to which an engine block may be attached, and an anchor member 12 which may be attached to a chassis. For clarity, neither the engine block nor the chassis has been shown.

The mount including the support 10 and anchor 12 is such that it may subtantially absorb engine movements. To this end, a relatively sturdy elastic or resilient member 14 is provided for connecting the support 10 to the anchor 12. The resilient member 14 may be made of rubber or the like and forms part of an enclosure of an upper chamber 22 of the hydraulic mount. As may be seen, the resilient member 14 is connected to the anchor 12 by means of a wall member 16 and a cup-shaped bracket 32. The bracket 32 preferably is made of metal. The chamber 22 may be filled with fluid such as, for instance, water and is separated from a second lower chamber 24 by a wall comprising two flat diaphragm members 18 and 20. The diaphragms 18 and 20 are superposed and aligned in parallel relative to each other. They enclose a membrane 28. The membrane 28 is mounted for limited free movement within a cavity 36 positioned between the diaphragms 18 and 20. The upper diaphragm 18 (FIG. 5) is provided with a plurality of perforations 25, and the lower diaphragm 20 is also provided with perforations 26. The perforations 25 and 26 permit limited quantities of fluid to flow to either side of the membrane 28. The limited flow of fluid between the chambers 22 and 24 is possible either because of the porosity of the membrane 28 or by way of a passage formed by the cavity 36. When fluid from chamber 22 enters chamber 24 a wall 34 sealing the bottom of the chamber 24 changes its configuration to enlarge the volume of the chamber 24 by bulging out into an empty space 30 between wall 34 and bracket 32. A certain damping action sufficient to absorb or balance movements of low frequency results from this limited transfer of fluid from chamber 22 into the chamber 24. However, at high frequency movements acting upon the chamber 22 an absorption or balancing of the amplitudes by this fluid transfer cannot be accomplished. Some absorption may result from the yielding of the membrane 28. At strong movements, however, the membrane 28 moves into engagement with the diaphragm 20, and the resiliency of the mount then becomes solely a function of the inherent resiliency of the member 14.

In accordance with the invention, a bypass or passage 50 is provided for establishing a connection between the chambers 22 and 24. The bypass 50 may be opened whenever a stiff engine mount is undesirable as is the case, for instance, at low engine speeds, so that, as the membrane 28 engages the diaphragm 20, fluid may flow from the chamber 24 through the bypass 50 substantially unimpeded.

The bypass 50 comprises a valve member (not shown) which may be selectively opened and closed; it remains closed at high engine revolutions, the result being a relatively soft mount at low amplitudes and a stiff mount at higher amplitudes. At low engine speeds the bypass 50 is opened so that the mount remains soft even at high amplitudes to prevent the transmission of hard knocks. Therefore, high amplitude and low frequency engine movements resulting from an irregularly running engine or during starting of the engine are substantially absorbed.

Figure 6A:
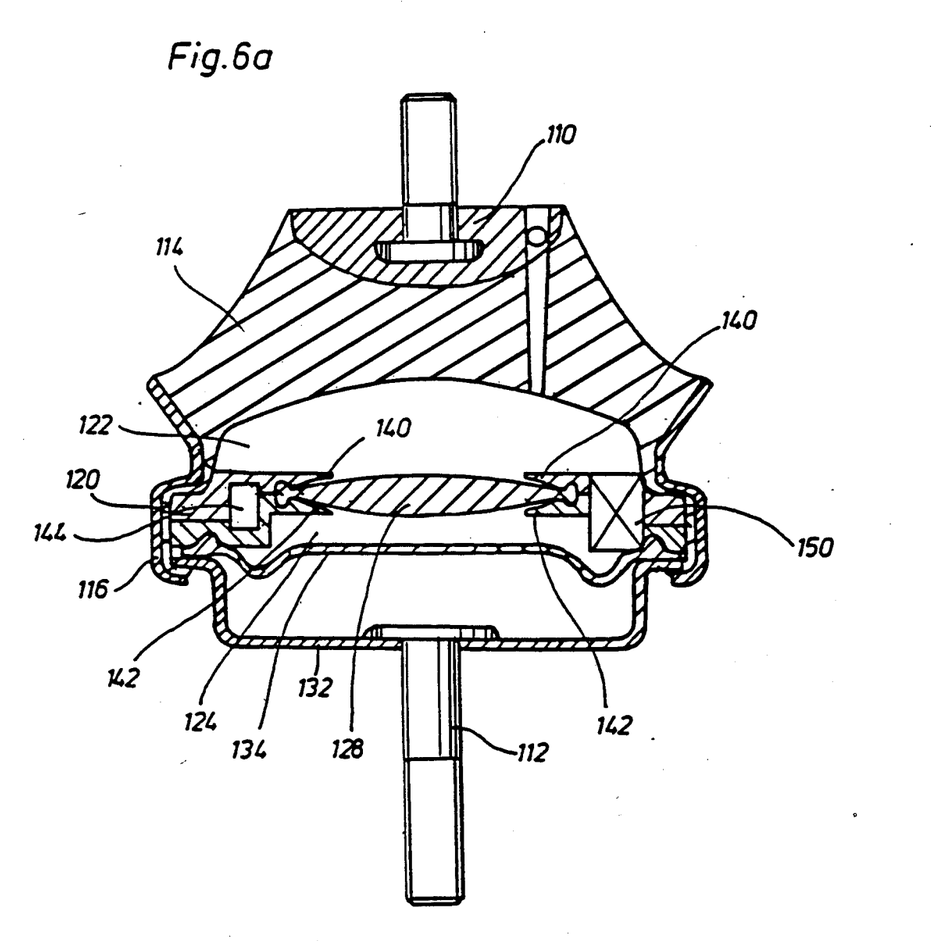

FIG. 6A depicts another embodiment of a hydraulic engine mount in accordance with the invention. This mount, too, comprises a support member 110 and an anchor 112. Support 110 and anchor 112 are interconnected by way of a resilient member 114 and a rigid housing wall member 116. The wall member 116 is connected to the anchor 112 by way of a cup-shaped bracket 132. The bracket 132 is preferably made of metal.

The space enclosed by the resilient member 114, the housing wall 116, and the bracket 132 is provided with a yieldable wall member 134. As well as resilient member 114 the wall 134 may be fabricated of rubber or the like. The wall 134, together with the housing wall 116 and the resilient member 114, serves to enclose a space which may be filled by a liquid. This space is divided into two chambers 122 and 124 by means of a membrane 128. The membrane 128 is held within a resilient structure 120. The structure 120 is preferably made of rubber or the like, and retains the membrane 128 by its margin for limited free movement normal to its surface. However, at larger deflections, the membrane 128 engages protrusions 140 or 142 extending inwardly of the structure 120 and is thus prevented from further deflecting.

Figure 6B:
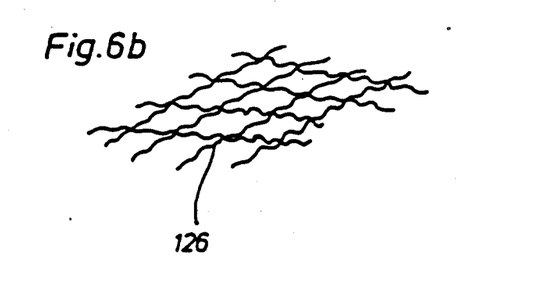

The membrane 128 may be made either of stiff or of elastic material. To render it elastic, it may be made, for instance, of a web having an inherent elasticity. Preferably, the membrane 128 is made of web (FIG. 6B) the threads of which may be ondulating or crimped to render them elastic or extensible. When the threads are stretched to their maximum extent which preferably coincides with the engagement of the membrane 128 with a protrusions 140 or 142, the membrane 128 can yield no further. Thus, at this instance, the membrane 128 functions as a relatively stiff wall between the chambers 122 and 124.

There is provided within the structure 120 a conduit 144 which connects the chambers 122 and 124. The conduit 144 acts as a throttle or damping member. Thus, under static or low frequency loads, an exchange of fluid between the chambers 122 and 124 is possible. However, at loads or movements of higher frequency, the exchange of the fluid between the chambers 122 and 124 becomes restricted to the point where the resiliency of the mount at low amplitudes is determined by the elasticity of the membrane 128. That is to say, the membrane 128 will yield in a downward direction to any load exerted on the chamber 122, and it will yield toward the anchor 112 until it reaches the limit of its elasticity at which point, it will abut against the protrusion 142. The resiliency of the mount is then determined by the inherent resiliency of the member 114, i.e., the mount will then be relatively stiff.

When starting the engine or when the engine is running irregularly for any reason, so that it generates movements of high amplitudes, a stiff or unyielding mount becomes undesirable. For this reason, a bypass 150 is provided which connects the chamber 122 with the chamber 124. The bypass 150 is such that fluid may flow through it substantially without restriction. Since the bottom wall 134 of the chamber 124 is yieldable, the chamber 124 may absorb any fluid flowing into it from chamber 122. The bypass 150 is provided with a valve member (not shown) which may be opened whenever it is undesirable that movements of large amplitudes are transferred to the anchor 112. As mentioned above, this may be the case, for instance, when the engine is being started or when it is running roughly for any other reason. As soon as the engine is running smoothly, the valve member in the bypass 150 may be closed again.

Figure 7:
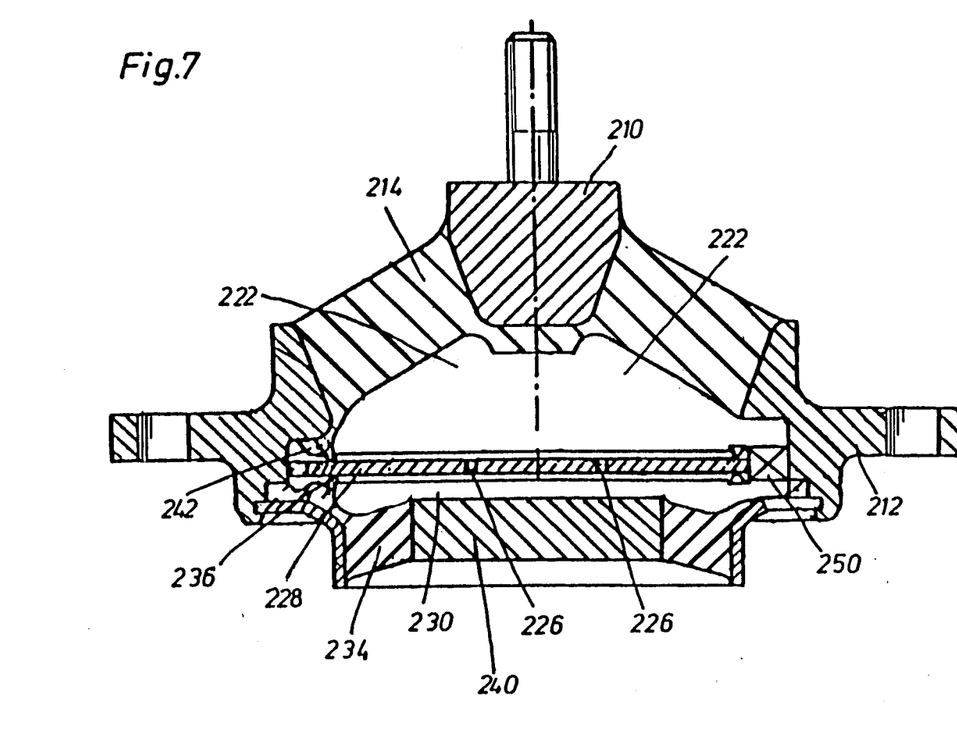

FIG. 7 depicts a further embodiment of a hydraulic engine mount. This mount also comprises a support 210 as well as an anchor 212. The support 210 and the anchor 212 are connected to each other by an elastic member 214. A fluid contained within this mount is substantially sealed in by the elastic member 214, into which a support member 210 may be vulcanized, by the substantially annular anchor 212 as well as an annular elastic member 234 which is connected to the bottom of the anchor 212 and which is provided in its center with a mass 240.

The mount encloses two chambers 222 and 230 which are separated from each other by a diaphragm 228. The diaphragm 228 is mounted in substantial coplanar relationship to the annular anchor 212.

The diaphragm 228 is substantially rigid and is provided with perforations 226 which owing to their small dimensions exert a throttling action on any fluid flowing from the chamber 222 into the chamber 230. The periphery of the diaphragm 228 is retained between soft lip members 236 which permit relatively unimpeded movement of the wall member 228 at low amplitudes in a direction substantially normal to its surface. At higher amplitudes, the wall member 228 moves into engagement with an abutment 242 which prevents its further movement or deflection. The abutment 242 is preferably made of an elastic material such as rubber.

The mass 240 imbedded in the wall 234 of the lower chamber 230 serves as an absorptive mass which at higher frequencies improves the absorptive characteristics of the mount relative to its static stiffness by vibrating at a phase opposite to the vibrations induced in the support 210. This principle of absorption is well known, however, and does not constitute part of the invention here described.

In accordance with the invention, there is provided between the chambers 222 and 230 a conduit 250 which may be opened by way of a valve (not shown) at low engine revolutions and it may be closed at higher engine speeds. The dimensions of the conduit or bypass 250 are such that a fluid may freely flow from the chamber 222 into the chamber 230, without being impeded.

Figure 8:
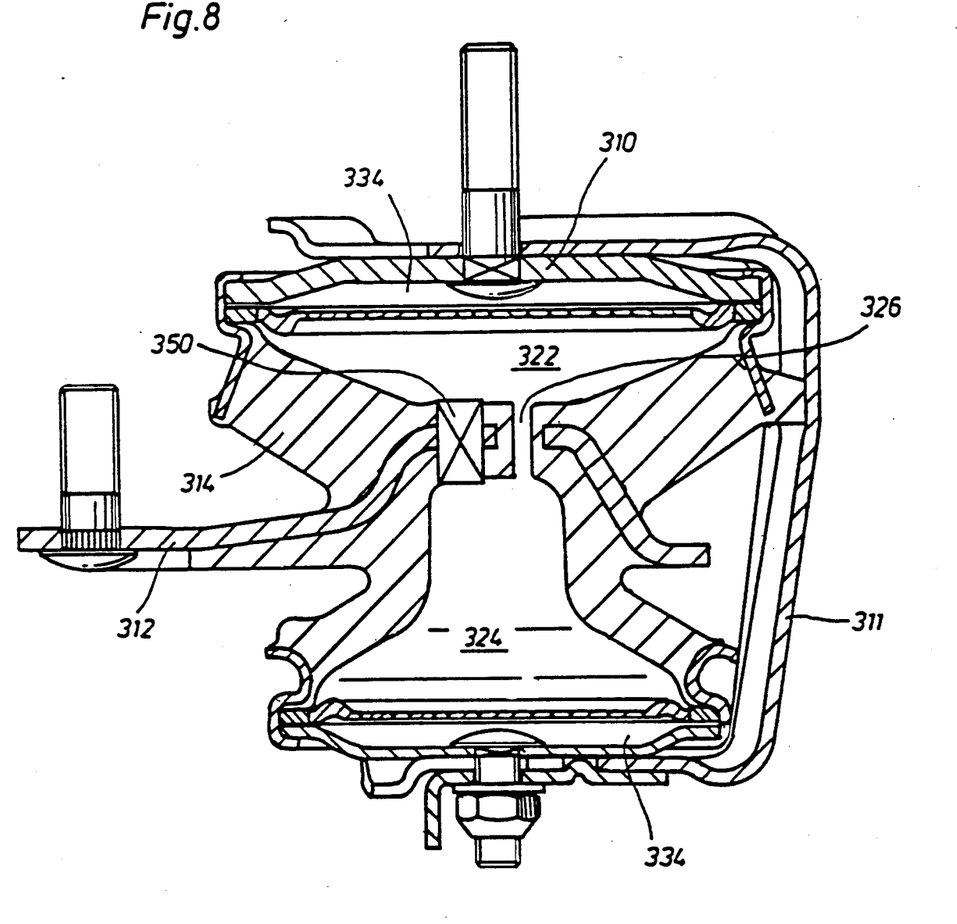

A further embodiment of a hydraulic engine mount in accordance with the invention is depicted in FIG. 8. Here, a support member 310 is connected to an anchor 312 by means of an elastic member 314. The member 314 may be made of rubber or the like. It is of substantially cylindrical configuration and encloses a fluid filled chamber which is divided into two chambers 322 and 324 by way of a necked down portion. The top of the mount is sealed by a plate connected with the support 310. The plate, in turn, is rigidly connected to a further plate at the bottom of chamber 324 so that movement of the support member 310 which reduces the volume of chamber 322 induces forced movement in a downward direction of the lower plate, and this results in an increase in the volume of chamber 324.

Above the chamber 322 and beneath the chamber 324 there are provided chambers 334. The chambers 334 are empty, i.e., they are not filled with liquid. Therefore, movements of low amplitudes do not lead to a change in the volume of the liquid filled chambers. Only movements of higher amplitudes have an effect on the support 310 and the chambers 322 and 324 in that pressure within chamber 322 in increased and pressure within chamber 324 is reduced. A throttle conduit 326 is provided between the chambers 322 and 324 by means of which, at least under static loads of low frequency vibrations, the pressure in the upper and lower chambers 322 and 324 may be balanced by limited exchange of fluid. The mount in this case remains relatively soft. However, in case the flow of fluid through the throttle 326 exceeds the capacity of the throttle, the throttle 326 is rendered ineffective and the mount becomes relatively stiff.

When, as is the case in high amplitude vibrations, a stiff mount is undesirable, a passage or bypass 350 extending in parallel to the throttle 326 may be opened. The dimension of the passage 350 is such that it permits fluid to flow between the chambers 322 and 324 substantially unimpededly. As in the embodiments described above, a valve (not shown) may be incorporated in the bypass 350 which may be closed under certain operating conditions as, for instance, when the engine is running smoothly at higher speeds, and it may be opened at rough engine performance.

Figure 9A:
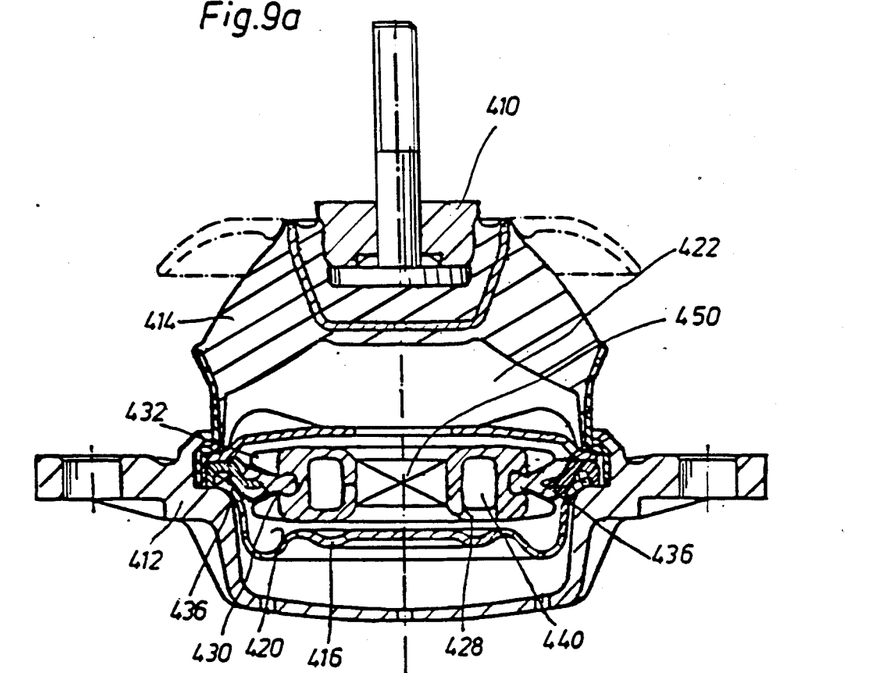
Figure 9B:
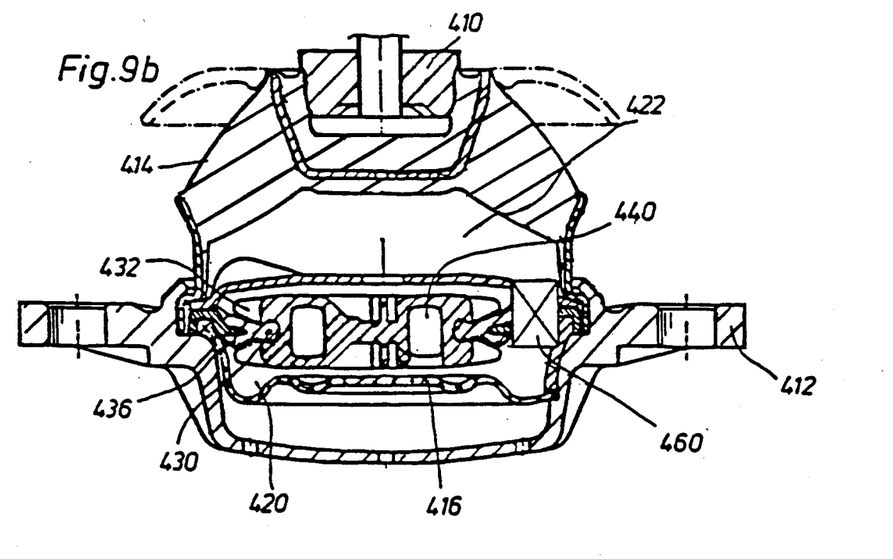

FIGS. 9A and 9B illustrate further embodiments of the invention. In the mounts here shown, movements are transferred from a support member 410 to a cup-shaped anchor 412 by way of an elastic member 414. The elastic member 414 may be made of rubber or the like and is substantially bell shaped. The member 414 and the anchor 412 enclose a cavity, the upper portion of which is sealed by a yieldable wall or bellows 416. The cavity enclosed by the member 414 and the bellows 416 is filled with a fluid and is separated into two chambers 420 and 422. A rigid wall 428 is movably mounted between the chambers 420 and 422. The wall 428 is perforated by a throttle conduit 440 which connects the chamber 420 with the chamber 422. The rigid wall 428 is supported by a softly elastic suspension member 430 which permits limited movement of the wall 428 in upper and lower directions. High amplitude movements, however, cause a protrusion 432 provided on the substantially circular wall 428 to engage a bracket 436 supporting the soft suspension member 430. The wall 428 is, therefore, substantially barred from further movement once the protrusion 432 abuts against the bracket 436. The bracket 436 may be made of rubber which would permit a resilient or gradual stopping of the movement of the rigid wall 428.

As in the previously described embodiments, there is provided a bypass 450 (FIG. 9A) or 460 (FIG. 9B). The bypass 450 is provided substantially in the center of the wall 428, whereas the bypass 460 is located radially displaced of the wall 428 and is seated in substantially immovable components of the mount. As in the previously described embodiments, the bypasses 450 or 460 are provided with externally controlled valves (not shown) for regulating the flow of fluid in accordance with the running conditions of an engine (not shown) support by the mount.

Figure 10:
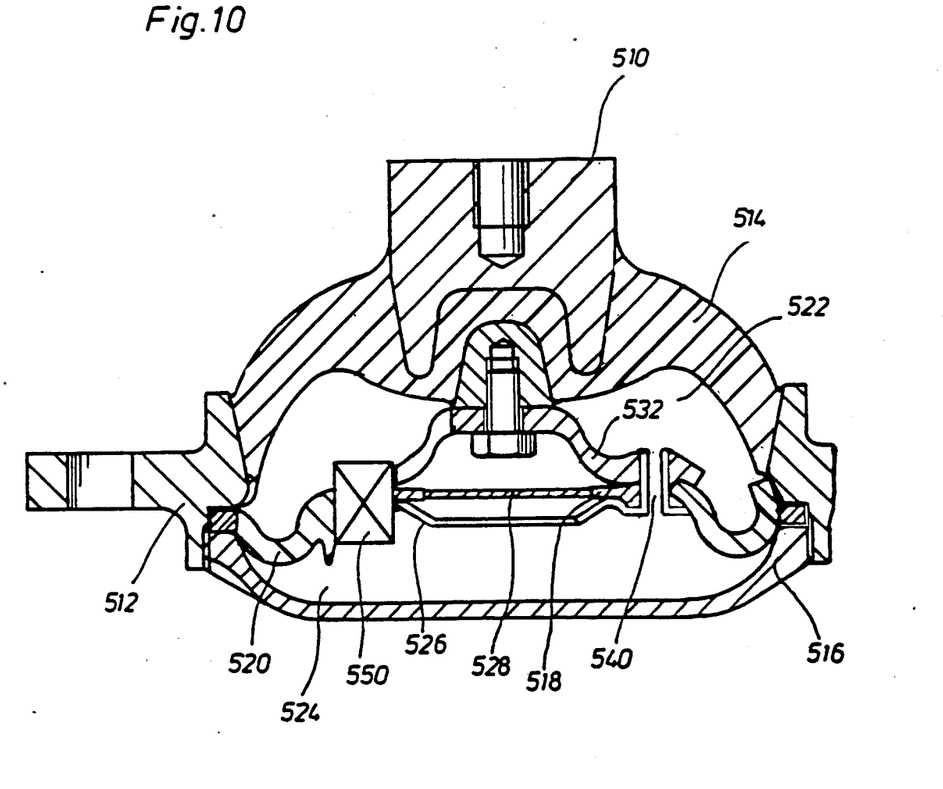

A still further embodiment of a hydraulic mount in accordance with the invention is shown in FIG. 10. The mount comprises a support member 510 which transfers movement to an anchor 512 by way of an elastic member 514. The elastic member 514 may be made of rubber or the like and is of cup-shaped configuration. It is sealed at the bottom by a wall member 516 with which it forms a fluid chamber within which there is provided a diaphragm 518. The diaphragm 518 is connected to the anchor 512 by way of a bellows 520, and it is also connected to the support 514 by means of a bridge member 532. Movement of the support 514 thus induces forced movement in the diaphragm 518. Since the diaphragm separates the fluid chamber into two chambers 522 and 524, movement of the diaphragm 518 leads to an enlargement of one of the chambers 522 or 524 on the one hand and to a reduction in the size of the other chamber on the other hand. For balancing the change in volume, there is provided in the center of the diaphragm 518 a membrane 528 which is deflectable in upward and downward directions. The membrane 528 is retained in a rigid annular portion of the diaphragm 518. With larger deflections, the membrane 528 is forced into engagement with an abutment. Thus, its deflection is limited, and a further exchange of fluid between the chambers 522 and 524 may take place through a throttling conduit 540 only. At high frequency movements very limited flow of fluid only may take place between the chambers 522 and 524 through the conduit 540. Therefore, the mount remains relatively stiff.

In order to avoid the stiffness of the mount during certain operating conditions, a large conduit 550 is provided between the fluid chamber 522 and 524. The conduit or bypass 550 may be located at the junction between the wall 528 and the bellows 520. The bypass 550 may be opened and closed by a valve (not shown) as required to suit the operating conditions of an engine (not shown). In fact, an operating parameter of the engine may be used to control the size of the conduit 550 by regulating the valve. As in the previously described embodiments, the revolutions of the engine may be drawn upon the regulate the valve by appropriate control circuits (not shown). The valve or bypass 550 may thus remained closed when an engine is running above a predetermined speed, and fluid may be exchanged between the chambers 522 and 524 only through the throttle 540. At low engine speeds, i.e., at engine movements at high amplitude, the bypass 550 may be opened, and the throttle 540 is thus rendered ineffective as substantially unimpeded flow of fluid between the chambers 522 and 524 may then take place through the bypass 550. Hence, the mount would remain soft, i.e., capable of absorbing engine movements of high amplitudes, under conditions which would normally cause the membrane 528 to move against the abutment 526 if it were not for the opened bypass 550.

Figure 11:
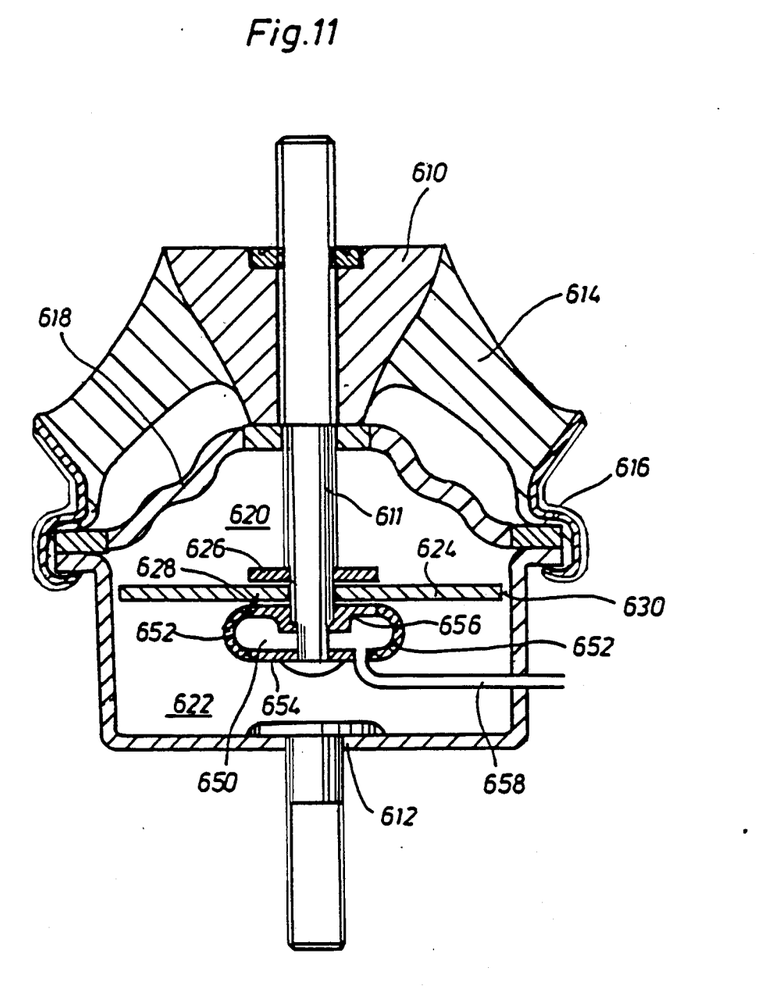

Reference is now made to the embodiment of FIG. 11. The hydraulic engine mount of FIG. 11 differs from the previously described ones in that the device for rendering a throttle conduit ineffective is not a bypass between two fluid filled chambers. Instead, this embodiment is constructed to function in the following manner:

Vibrations or movements are transferred from a support 610 to an anchor 612. The support 610 and the anchor 612 are connected to each other by an elastic member 614 and by a wall 616. The anchor 612 is shaped like a bowl and is sealed by an elastic wall or bellows 618. The periphery of the wall 618 is affixed to an upper rim of the anchor 612, and the center of the wall 618 is affixed to the support 610. Therefore, movement is imparted to the wall 618 whenever the support 610 or the anchor 612 is moved. The interior of the anchor 612 is filled with water or silicon. Since the volume of the anchor 612 is variable because of the elasticity of the wall 618, the static stiffness of the mount is subtantially a function of the elastic member 614 connecting the support 610 and the anchor 612.

However, the dynamic stiffness of the mount is also a function of its interior construction for the support 610 extends into the fluid chamber by means of an extension 611. At the end of the extension 611 of the support 610 there is affixed a plate member 624 by means of which the fluid chamber is divided into two sections 620 and 622. Movement of the extension 611 of the support 610 results in vertical movement of the plate 624 which, depending upon the direction of the movement, causes the sections 620 and 622 either to increase or to decrease in size, or vice versa. The plate 624 is slidably positioned between two abutment collars 626 and 628 affixed to the extension 611. Thus the extension 611 may execute small movements without the plate 624 moving as there is some free play between the plate 624 and the abutment 626 and 628. Only when the extension 611 executes large movements does the plate 624 engage one or the other of the abutments 626 and 628 and is thus moved within the fluid. The plate 624 is of circular configuration and its diameter is slightly less than the internal diameter of the anchor 612. This leaves a small gap 630 between the internal wall of the anchor 612 and the periphery of the plate 624, and this gap permits limited flow of fluid between the chambers 620 and 622. Since the upper chamber 620 is sealed by the wall 618, upward movement of the support 610 and the extension could increase the volume of the chamber 620. However, resultant negative pressure in the lower chamber 622 would cause fluid slowly to escape from chamber 620 through the annular throttle gap 630 into the chamber 622 and thus restore a pressure balance in the fluid.

Compulsory flow of fluid through the throttling gap 630 may be avoided in the following manner: There is provided within the chamber 622 a compressible capsule 650 comprising two rigid discs 654 and 656 connected to each other along their margins by an elastic sleeve 652. The capsule 650 which as shown is mounted on the extension 611, is controllable by a conduit 658 leading to the exterior of the mount and connected to appropriate controls (not shown). That is to say, the internal pressure within the capsule 650 may be changed by way of the conduit 658. By low pressure within the capsule 650 high pressure within the chamber 622 caused by downward movement of the support 610 may be balanced by compression of the capsule 650. Therefore, the substantially incompressible fluid within the chamber 622 need not flow into the chamber 620 through the grap 630. On the other hand, when the support 610 moves upwardly, low pressure in the fluid of the chamber 622 may be compensated by expansion of the capsule 650. Flow of fluid from the chamber 620 into the chamber 622 through the gap 630 is thus substantially avoided as well.

By pumping a gaseous or a liquid medium into the capsule 650 at high pressure balancing of the volume within the chamber 622 by way of the capsule 650 is no longer possible or at best it is possible to a very limited degree only; balance of fluid pressure in the chambers 620 and 622 can then be accomplished only by the flow of fluid through the gap 630.

As will be appreciated by those skilled in the art, the throttle action of the gap 630 in this embodiment is rendered ineffective by selecting pressurizing or deflating the capsule 650. Activation or deactivation of the throttle 630 can be made dependent upon, or may be controlled by, parameters similar to those described in the previous embodiments. For this purpose, the conduit 658, as stated above, is connected to appropriate controls.

Figure 12:
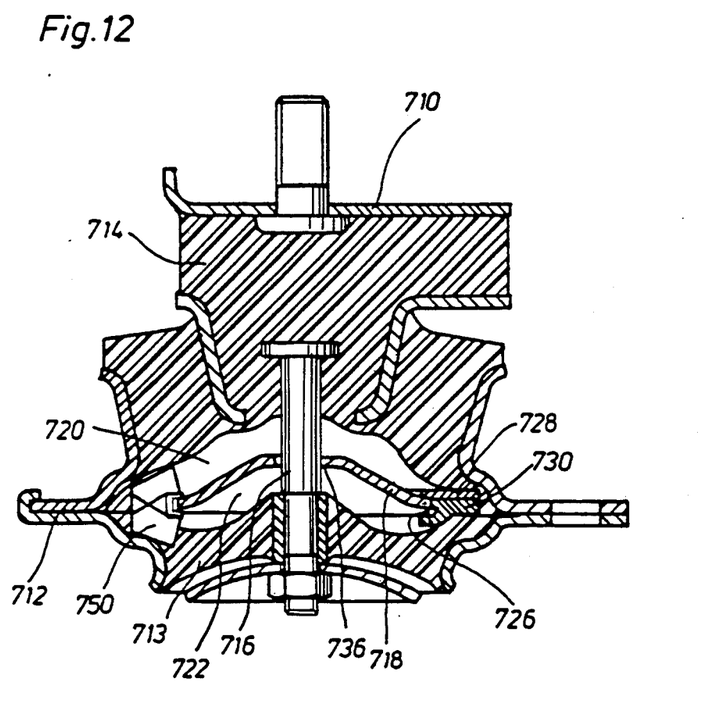

FIG. 12 depicts a further hydraulic engine mount in accordance with the invention. The mount comprises a support 710 connected to an anchor 712 by means of an elastic member 714. There is enclosed within the mount a liquid-filled chamber which is divided into two sections 720 and 722 by a wall member 718. The chamber is filled with a fluid and is at its lower end closed by an elastic wall 713. The elastic wall 713 is connected to the anchor 712. At its upper end, the chamber is closed by the elastic member 714. A plunger 716 connects the elastic member 714 with a wall 713 in such a way that they must move together. The plunger 716 extends through an opening of the wall 718. The wall 718 is supported at its peripheral margin by two abutments 728 and 730, both of which are connected to the anchor 712. Relative movement between the support 710 and the anchor 712 causes the volume of the chamber 720 and/or 722 to change, and at movement of low amplitude the change may be compensated within the limits of free play between the wall 718 and the abutments 728 and 730. At movements of higher amplitudes, fluid may flow through a narrow gap surrounding the plunger 716 in an opening 636 of the wall 718. This gap acts as a throttle which renders the mount very stiff as soon as the flow of fluid exceeds the flow-through capacity of the gap.

To relieve the throttle gap, a conduit 750 is provided between the chambers 720 and 722. The conduit 750 bypasses the wall 718 and is provided with a selectively controllable valve (not shown) for opening and closing the conduit 750 in response to parameters, such as engine revolutions, in a manner similar to the embodiments described above, to render the mount soft or stiff depending upon engine performance.

Figure 13:
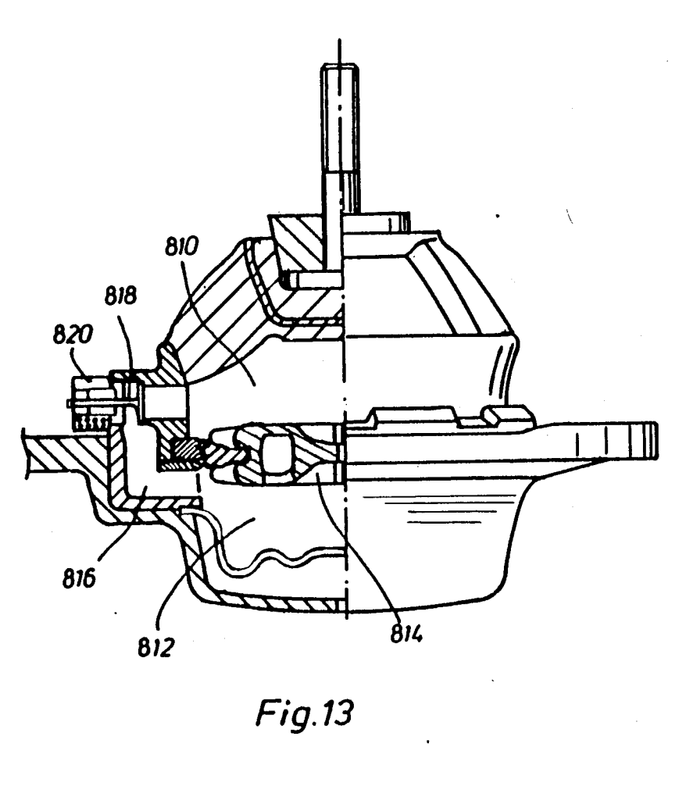

A further embodiment of the invention which in its construction substantially corresponds to the mounts referred to above, is depicted in FIG. 13. Two fluid chambers 810 and 812 are separated from each other by a deflectable wall 814. A bypass 816 is provided for selectively connecting the chambers 810 and 812 with each other. A valve 818 seated within the bypass 816 blocks fluid from flowing between the chambers 810 and 812 through the bypass 816 when it is shut. When open, the valve 818 provides for substantially unimpeded flow of fluid between the chambers 810 and 812. The valve 818 is controlled by an electromagnet 820 which, in turn, may be controlled by the speed of the engine (not shown).

Figure 14:
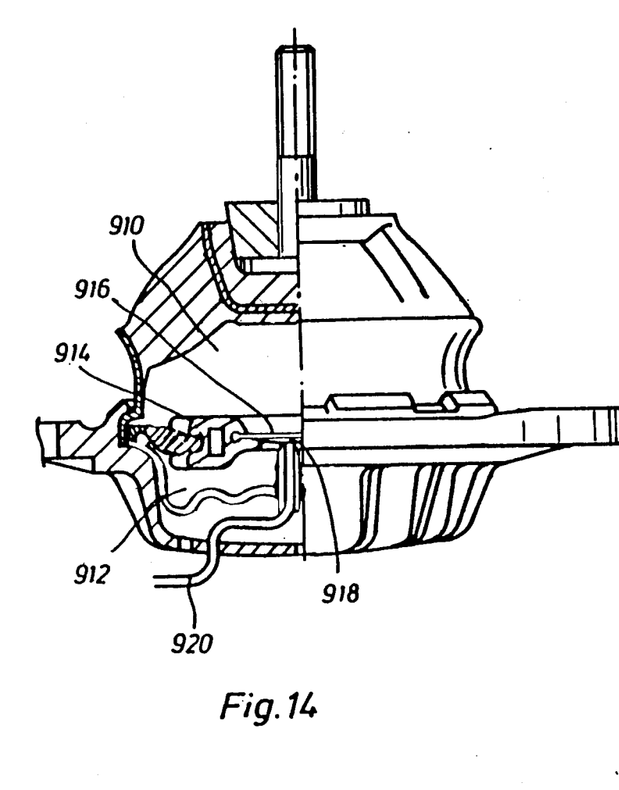

Yet another embodiment is shown in FIG. 14. In this case, too, the mount comprises two fluid-filled chambers 910 and 912 which are kept separate from each other by a deflectable element 914. Within the element 914 there is seated a membrane 916, one surface of which is affected by the volume of the chamber 910; the other surface faces an empty chamber 918 embedded between the membrane 916 and the element 914. The chamber 918 may be connected to atmospheric pressure by a conduit 920. When the chamber is thus connected, the membrane 916 is relatively elastic and may be deflected by variations of the pressure within the chamber 910. The deflectable element 914 is not affected by such pressure variations as they will be absorbed by the membrane 916. By connecting the conduit 920 to vacuum pressure, instead of atmospheric pressure, the membrane 916, because of the resultant vacuum pressure within the chamber 918, will move into engagement with the deflectable member 914. Accordingly, the elasticity of the membrane 916 is rendered ineffective, and the mount then functions in the manner of a conventional dual chamber hydraulic engine mount. That is to say, pressure imbalances between the chambers 910 and 912 are equalized by deflection of the movable element 914 and/or by throttle conduits (not shown).

Advantageously, the chamber 918 is connected to atmospheric pressure at low engine speeds, since in this manner the mount is rendered soft for the membrane 916 effectively absorbs movements of high amplitude. Vacuum pressure is applied to the chamber 918 once the engine is running faster and smoother; the membrane 918 is thus rendered ineffective by engagement with the deflectable element 914.

As will be apparent to persons skilled in the art, the various embodiments of hydraulic engine mounts here decribed and incorporating the principles of the invention are by no means exhaustive. Other constructions embodying the inventions may be provided. Moreover, it will be apparent that opening and closing of the bypass need not necessarily be controlled by such parameters as the speed of the engine. Rather, the bypass may be arranged whenever the mount becomes too hard, i.e., whenever a softer response of the mount is desirable. Those skilled in the art will know sensors and control circuitry suited to render the hydraulic engine mount appropriately operational for absorbing, neutralizing, or at least reducing the effects of engine movements of high amplitude.

What is claimed is:

1. An apparatus for selectively absorbing relative movements of high amplitude and low frequency between two elements, comprising:
    support means adapted to be affixed to one of said elements;
    anchor means aligned substantially coaxially relative to said support means and adapted to be affixed to the other of said elements;
    resilient means for connecting said support means to said anchor means for movement relative to each other in response to relative movement between said two elements and for forming a substantially sealed chamber for retaining a substantially incompressible fluid;
    means for dividing said chamber into two sections of variable and complementary volumes and for yielding to predetermined differences in pressure in the fluid in said two sections as a result of relative movement between said support means and said anchor means;
    throttle means of substantially constant capacity for providing a limited exchange of fluid between said section in response to relative movement between said support means and said anchor means;
    means for limiting the yielding of said dividing means in response to relative movement at at least said high amplitude between said two elements; and
    means for selectively bypassing said throttle means at least at relative movement between said two elements of at least said high amplitude thereby providing a substantially unimpeded exchange of fluid between said two sections and providing movement between said support means and said anchor means as a function of said resilient means.

2. The apparatus of claim 1, wherein one of said two elements is an internal combustion engine and wherein the other of said two elements is the chassis of an automotive vehicle.

3. The apparatus of claim 2, wherein said throttle bypassing means comprises a selectively openable valve means.

4. The apparatus of claim 3, wherein said valve means is controlled by means responsive to movement of said internal combustion engine.

5. The apparatus of claim 2, wherein said throttle bypassing means comprises a fluid-filled capsule submerged in said fluid in one of said two sections and selectively connectible to means for controlling the pressure of said fluid within said capsule.

6. The apparatus of claim 2, wherein said throttle means comprises at least one perforation in said yieldable means.

7. An apparatus for selectively absorbing relative movement of high amplitude and low frequency between an internal combustion engine and the frame of an automotive vehicle, comprising:
    first and second means mounted for movement relative to each other along a predetermined axis and adapted to be connected to said engine and said frame, respectively;
    means for establishing a connection of a first degree of resiliency between said first and second means and for the forming a substantially sealed chamber between said first and second means for retaining a substantially incompressible fluid in said chamber, said fluid imparting to said connection a second degree of resiliency less than said first degree;
    means yielding in response to differences in pressure in said fluid in said two sections in response to relative movement between said first and second means and for dividing said chamber into two sections of variable and complementary volumes;
    throttle means for providing a limited exchange of fluid between said two sections in response to differences in pressure in said fluid in said two sections as a result of relative movement between said first and second means;
    means for limiting the yielding of said dividing means as a function of amplitude and frequency of said relative movement;
    means for selectively bypassing said throttle means in response to relative movement between said first and second means at an amplitude not less than said high amplitude for providing an unimpeded exchange of said fluid between said two sections for increasing the resiliency of said connection to substantially said first degree of resiliency.

* * * * *